United States Patent [19]
Pohl

[11] Patent Number: 4,722,018
[45] Date of Patent: * Jan. 26, 1988

[54] BLOCKED CONDENSER AIRFLOW PROTECTION FOR REFRIGERATION SYSTEMS

[75] Inventor: Walter J. Pohl, Louisville, Ky.

[73] Assignee: General Electric Company, Louisville, Ky.

[*] Notice: The portion of the term of this patent subsequent to Jan. 26, 2005 has been disclaimed.

[21] Appl. No.: 806,608

[22] Filed: Dec. 9, 1985

[51] Int. Cl.⁴ .......................... H02H 3/07; H02H 7/08
[52] U.S. Cl. ...................................... 361/22; 361/29; 361/33; 361/86; 318/782; 318/445
[58] Field of Search ...................... 361/22, 33, 28, 29, 361/72, 86, 88-92; 318/805, 806, 812, 432, 485, 434, 782; 62/129, 230; 340/648, 661, 662, 663; 364/483

[56] References Cited
U.S. PATENT DOCUMENTS

| | | | |
|---|---|---|---|
| 3,585,451 | 6/1971 | Day | 62/230 X |
| 3,875,487 | 4/1975 | White | 318/485 |
| 4,038,061 | 7/1977 | Anderson et al. | 62/126 |
| 4,079,432 | 3/1978 | Godfrey | 361/23 |
| 4,084,204 | 4/1978 | Jacobus, Jr. | 361/59 X |
| 4,196,462 | 4/1980 | Pohl | 361/33 |
| 4,197,532 | 4/1980 | Lawson, II | 340/648 |
| 4,253,130 | 2/1981 | Newell | 361/22 |
| 4,286,303 | 8/1981 | Genheimer et al. | 361/24 |
| 4,502,287 | 3/1985 | Hare et al. | 361/92 X |

Primary Examiner—Philip H. Leung
Assistant Examiner—Tedd E. DeBoer
Attorney, Agent, or Firm—H. Neil Houser; Radford M. Reams

[57] ABSTRACT

Refrigeration system control systems and methods for protecting a refrigerant motor/compressor, for example in an air conditioner, against conditions of excessive loading. The systems and methods of the invention recognize and distinguish between conditions of high operating load and insufficient condenser airflow, and take appropriate action for each. High operating load conditions are responded to by providing a motor/compressor cool-down interval, followed by a restart, so that an air conditioner remains operating at its maximum capacity, consistent with the field conditions. Insufficient condenser airflow conditions are responded to by eventually terminating operation of the motor/compressor until, for example, a service technician is called. Operation is based on a recognition that excessive loading conditions are manifested much sooner when the cause is insufficient condenser airflow than when the cause is a high operating load. In the disclosed embodiments, loading on the motor/compressor is sensed, and the motor/compressor is de-energized when a condition of excessive loading is recognized, whatever the cause. After a cool-down interval, the motor/compressor is re-energized, but a count is maintained of the number of times the motor/compressor is de-energized in response to a recognized condition of excessive loading. In order to distinguish between blocked condenser airflow conditions and conditions of excessive load, operation is terminated permanently when the count reaches a predetermined number such as six, but the count is reset when continuous run time exceeds eight minutes.

4 Claims, 9 Drawing Figures

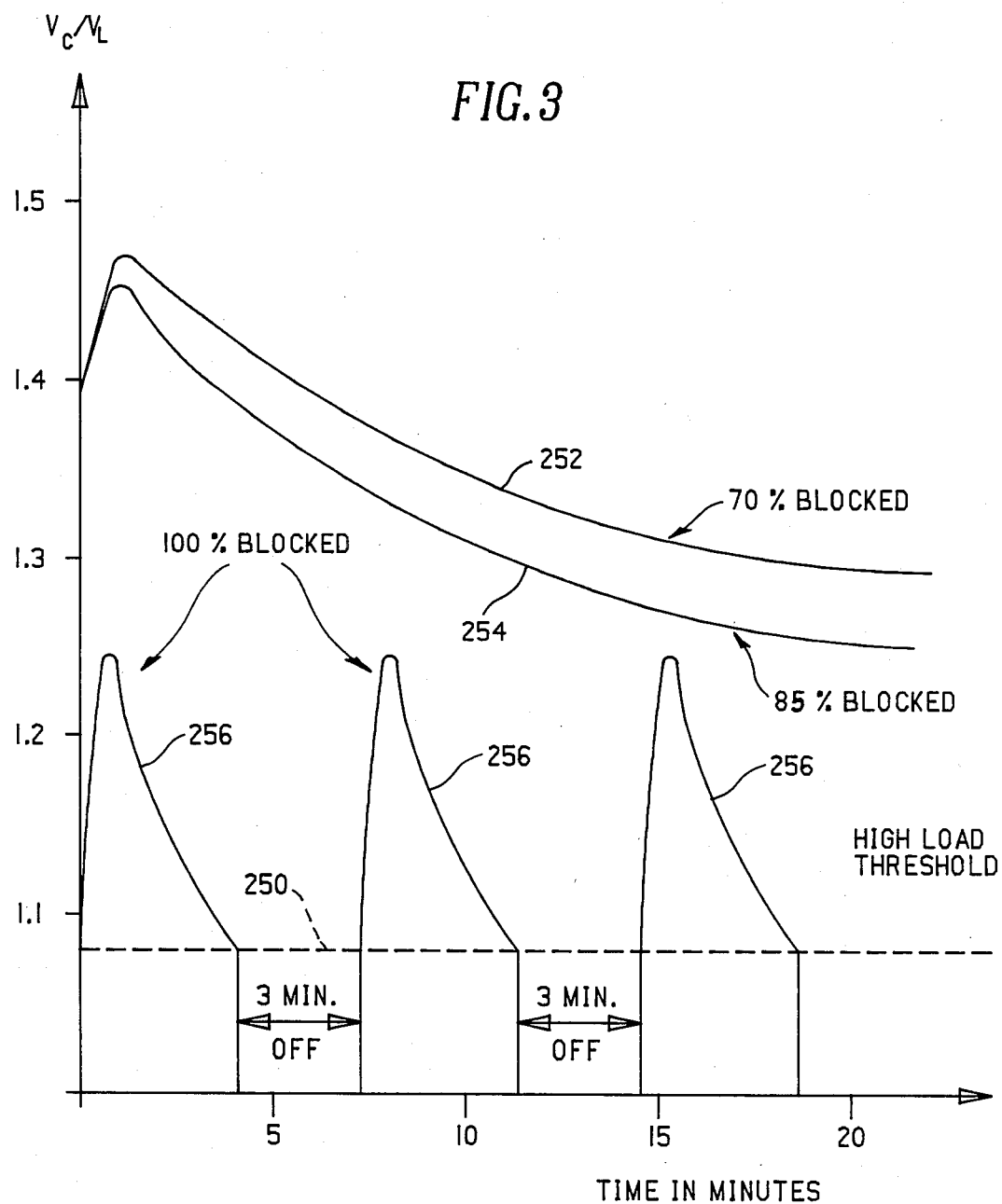

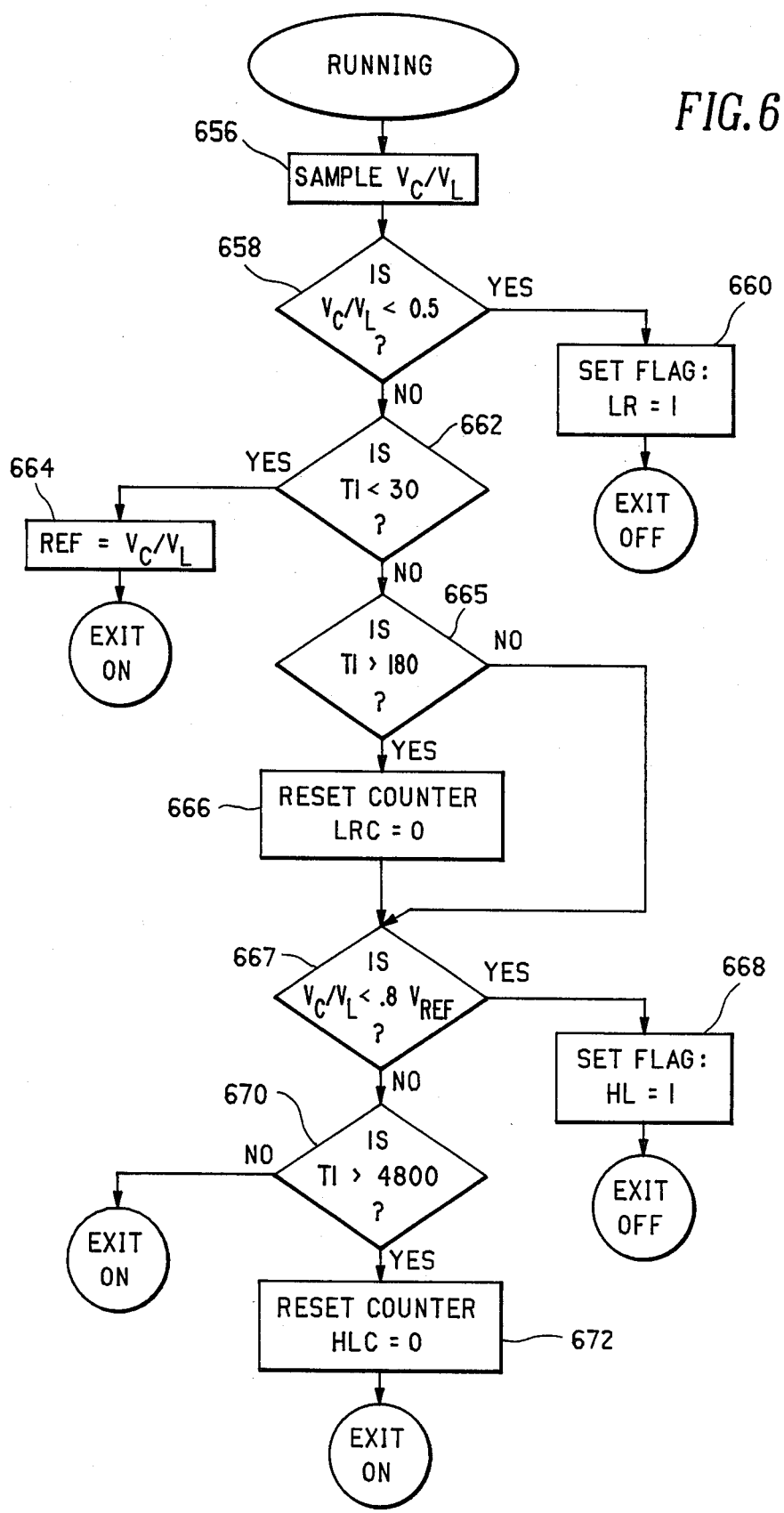

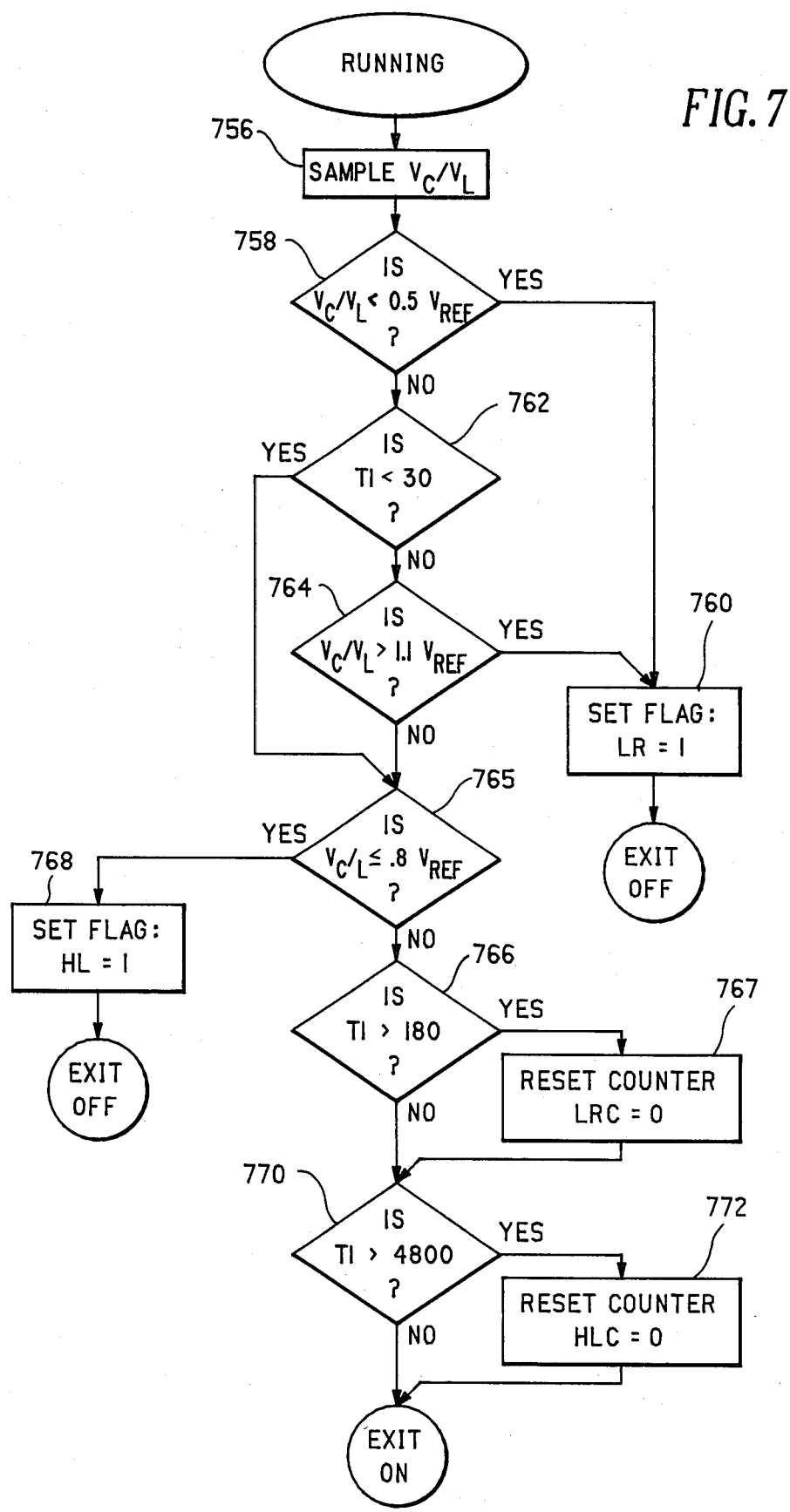

BLOCKED CONDENSER AIRFLOW PROTECTION FOR REFRIGERATION SYSTEMS

BACKGROUND OF THE INVENTION

The present invention relates to methods and systems for protecting motor/compressors in refrigeration systems, including air conditioners and heat pumps, against excessive loading caused either by a high operating load or by insufficient condenser airflow, as these terms are hereinbelow defined. In preferred embodiments the protection methods and systems of the present invention may be termed "generic" in that a single system is capable of serving a number of different models, of widely differing capacities.

The invention is generally applicable to refrigeration systems of the type employed in air conditioners and heat pumps for cooling and heating living spaces. Such units are available in a wide variety of physical configurations and capacities, two of which are small room air conditioners and self-contained reversible heat pump systems. The latter somewhat resemble room air conditioners, but provide both heating and cooling. For convenience, the invention is described herein in exemplary forms applied to a simple room air conditioner. The principles of the invention are also applicable to similarly-configured heat pump systems which provide both heating and cooling by means of a reversible refrigeration system, as well as central air conditioning systems which employ an indoor evaporator and a separate outdoor compressor/condenser combination.

Such refrigeration systems, while apparently simple to control, in fact require fairly sophisticated control systems if proper operation and protection from damage over a wide variety of operating conditions, often adverse, are to be achieved.

A basic form of protection for a refrigerant motor/compressor is overload protection, and is typically provided by a thermal or overcurrent sensor. By way of more specific example, various motor and compressor protection systems are disclosed in the following U.S. patents: Anderson et al. U.S. Pat. No. 4,038,061; Godfrey U.S. Pat. No. 4,079,432; Newell U.S. Pat. No. 4,253,130; and Genheimer et al. U.S. Pat. No. 4,286,303. Of these, Anderson and Newell disclose relatively comprehensive systems for protecting air conditioners and heat pumps, and employ a variety of current and temperature sensors. Godfrey and Genheimer et al disclose motor protection systems in general which include the function of allowing a motor to attempt a restart following an overload, but only for a limited number of times.

Another approach to motor protection, particularly for a refrigeration system compressor motor, is disclosed in commonly-assigned Pohl U.S. Pat. No. 4,196,462. As disclosed in that patent, a single-phase AC induction motor of the type employing a capacitor-run winding can be protected from overload (including locked-rotor) conditions by monitoring the voltage across the capacitor-run winding. Under heavy loading conditions, the winding voltage decreases. This can be sensed, and used to initiate appropriate protection measures, such as a timed cooling-off interval.

While not prior art with respect to the present invention, it may be noted that related, but more sophisticated, protection systems and methods are disclosed in two commonly-assigned U.S. patent applications. Specifically, these are Ser. No. 778,076 filed, Sept. 20, 1985, by Walter J. Pohl, entitled "Self-Calibrating Control Methods and Systems for Refrigeration Systems" now U.S. Pat. No. 4,653,285; and Ser. No. 778,075, filed Sept. 20, 1985, by Walter J. Pohl, entitled "Protection Methods and Systems for Refrigeration Systems Suitable for a Variety of Different Models"; the entire disclosures of which are hereby expressly incorporated by reference.

Very briefly, the systems described in application Ser. No. 778,076 sense loading on the compressor motor, preferably by sensing the voltage across the capacitor-run winding of an AC induction motor and normalizing with respect to line voltage. A self-calibrating protection capability is implemented by utilizing the changing load as a function of time characteristic on the compressor motor during normal and abnormal operation of a refrigeration system. More particularly, a reference value of compressor motor loading is determined and stored shortly after the start of each compressor ON cycle by allowing a stabilization interval (typically thirty seconds) to elapse, and then sensing loading and storing the sensed loading as the reference value to be used for the remainder of that particular ON cycle. In the preferred forms, it is the ratio of capacitor-run winding voltage to line voltage which is sensed and stored as a reference ratio. Thereafter, during each particular ON cycle, in order to recognize high load conditions, prevailing compressor loading is at least periodically sensed and compared to the stored reference. If the thus-sensed motor loading has increased above a high-load threshold, then a high load condition is recognized, and the compressor motor is de-energized for a timed cooling off interval. In the preferred forms, it is then-prevailing ratio of capacitor-run winding voltage to line voltage which is sensed and compared to the stored reference ratio. The compressor motor is de-energized if the then-prevailing ratio falls below a high-load threshold ratio established as a predetermined fraction of the reference ratio, typically 0.8 times the reference ratio. The approach disclosed in Ser. No. 778,076 can be made self-calibrating, and compressor motor protection afforded regardless of the size of the motor, since the motor control system establishes its own reference based on the characteristics of the particular motor. In this regard, the systems may be characterized as "generic".

The systems described in application Ser. No. 778,075 similarly sense loading on the compressor motor, but the reference for comparison purposes is not self-determined at the start of each compressor ON cycle. Rather, a permanent reference is established for each particular system in the factory, when the system is new, operating with a known correct refrigerant charge, and under a known load. The permanent reference is established after a timed stabilization interval has been allowed to elapse during which start-up transients, liquid slugging effects, and the like have dissipated, but before the compressor is significantly loaded as a result of pressure build-up. An advantage of the approach of Ser. No. 778,075 is that it permits a loss of refrigerant condition to be detected. While a calibration step is required, the technique nevertheless may be characterized as "generic" in the sense that a single control system may be employed in a variety of different air conditioner or heat pump models, without being specifically tailored for a particular model. Moreover, protection is afforded without the need for providing a variety of sensors.

Among the adverse conditions which can be detected by the various systems and techniques referred to above is a condition of excessive loading on the refrigerant motor/compressor, also referred to herein simply as a "high load" condition. There are two general categories of "high load" conditions, and these are herein referred to as a "high operating load" and "insufficient condenser airflow", respectively.

A "high operating load" can result when power line voltage is excessively low (a so-called "brown out" condition), or when operating under extreme ambient temperature conditions. On an extremely hot day, an air conditioning system may be subjected to both high load and low voltage. This tends to make the motor inefficient, which leads to overheating. Under such operating conditions, it is desirable to de-energize the compressor before damage results, then allow operation to resume after a cooling-off interval. Thus, the various systems referred to above typically respond to a high load condition by temporarily de-energizing the compressor motor for a cooling-off interval determined by either time or temperature. Operation then resumes until another cooling-off interval is initiated. In this way, the refrigeration system, specifically an air conditioner, is operated at its maximum capacity consistent with existing operating conditions.

It may be noted that a locked rotor condition is different from a "high operating load" as the term is employed herein, (although not all systems make a distinction). In the systems of the above-incorporated application Ser. Nos. 778,075 and 778,076, for example, a locked rotor condition is recognized by an exceptionally low capacitor-run winding voltage after an equilibrium speed interval has elapsed, a few seconds after the compressor has been energized. Failure of the compressor motor to start at all is usually due to an attempt to restart the compressor before pressures within the closed-circuit refrigeration system have had time to equalize. Normally, after a further delay, the compressor can be successfully started. However, if after several attempts the compressor does not start, a more serious problem is indicated. Accordingly, the systems of the above-incorporated application Ser. Nos. 778,075 and 778,076 each maintain a "locked-rotor count" and terminate operation entirely if the "locked-rotor count" exceeds a predetermined number, for example six. In the event a successful start occurs, recognized by, for example, three minutes of continuous run time, the "locked rotor count" is reset.

The other general category of "high load" conditions referred to above is an "insufficient condenser airflow" condition, which is sometimes referred to as a "blocked condenser". This condition can be caused by the condenser fan not rotating, or by sand or dust clogging up the condenser heat-exchange surfaces. Under such conditions, excessive refrigerant pressures build up in the system, and the compressor overheats. This is a condition which will not remedy itself, and treating it the same as a "high operating load" will likely lead to eventual damage.

SUMMARY OF THE INVENTION

Accordingly, it is an object of the invention to provide systems and methods for protecting a refrigerant motor/compressor in a closed-circuit refrigeration system against conditions of excessive loading of either the "high operating load" or the "insufficient condenser airflow" type.

It is a more particular object of the invention to distinguish between conditions of high operating load and insufficient condenser airflow, and to take appropriate action for each.

It is a related object of the invention to recognize and respond to high operating load conditions by providing a motor/compressor cool-down interval, followed by a restart, so that an air conditioner remains operating at its maximum capacity, consistent with field conditions.

It is a related object of the invention to recognize and respond to insufficient condenser airflow conditions by eventually terminating operation of the motor/compressor until, for example, a service technician is called.

Briefly, in accordance with the invention, it is recognized that excessive loading conditions are manifested much sooner when the cause is insufficient condenser airflow than when the cause is a high operating load. By way of example, from the time a motor/compressor ON cycle begins, under blocked condenser conditions, a point of excessive loading (manifested by excessive system pressures and temperatures) is reached typically in less than five minutes. In contrast, under conditions of a high operating load, a condition of excessive loading is typically not reached until at least eight minutes have elapsed.

Briefly stated, in accordance with an overall approach of the invention, loading on the motor/compressor is sensed, and the motor/compressor is de-energized when a condition of excessive loading is recognized, whatever the cause. After a cool-down interval, the motor/compressor is re-energized, but a count is maintained of the number of times the motor/compressor is de-energized in response to a recognized condition excessive loading. In order to distinguish between blocked condenser airflow conditions and conditions of high operating load, operation is terminated permanently when the count reaches a predetermined number such as six, but the count is reset when continuous run time exceeds eight minutes. Accordingly, a condition of excessive loading caused by insufficient condenser airflow ultimately results in operation being terminated. Conversely, a condition of excessive loading due to a high operating load results in a continuous cycling ON and OFF of the motor/compressor.

More particularly, a method in accordance with the invention for protecting a refrigerant motor/compressor in a closed-circuit refrigeration system against excessive loading caused by either a high operating load or insufficient condenser airflow includes the steps of during operation at least periodically sensing at least a representation of prevailing compressor motor loading and, in the event the prevailing loading exceeds a high load threshold, recognizing a condition of excessive loading and de-energizing the motor/compressor. Preferably, the prevailing compressor/motor loading is determined by sensing the ratio of capacitor-run winding voltage to line voltage. Another approach in accordance with the invention is to sense motor winding temperature.

The high load threshold loading can simply be a predetermined motor winding temperature. Preferably, however, the high load threshold loading is represented by a particular ratio of capacitor-run winding voltage to line voltage. In a self-calibrating implementation of the invention, a compressor motor reference loading is determined at a relatively early time during each compressor ON cycle by allowing a stabilization interval, for example within the range of five seconds to five minutes, to elapse during which the refrigeration system stabilizes and the compressor motor is still lightly loaded, and then sensing and storing at least a representation of compressor/motor loading as the reference loading. The high load threshold loading is then established as a predetermined function of the reference loading. In a calibrated implementation of the invention, a permanent compressor motor reference loading is established when the refrigeration system has a known correct refrigerant charge and the motor/compressor has a known load, this permanent compressor motor reference loading being a measured ratio of capacitor-run winding voltage to line voltage. The high load threshold loading is then established as a predetermined function of the permanent reference loading.

The invention includes a further step of, in the event the motor/compressor has been de-energized due to a recognized condition of excessive loading, allowing a cooling-off time interval to elapse, and then re-starting the motor/compressor.

The method of the invention includes the further step of maintaining the count of the number of times a motor/compressor is de-energized due to a recognized condition of excessive loading, and terminating operation in the event the count exceeds a predetermined number.

A final step in the method of the invention is measuring the time the motor/compressor is running and resetting the count when continuous run time exceeds a predetermined time duration indicating that the recognized condition of excessive loading was due to a cause other than insufficient condenser airflow.

The invention also provides a control system for protecting a refrigerant motor/compressor in a closed-circuit refrigeration system against excessive loading caused by either a high operating load or insufficient condenser airflow. The control system includes a switching element for cycling the refrigeration system ON and OFF by energizing and de-energizing the compressor motor.

A means for sensing at least a representation of compressor motor loading is included. The sensing means may comprise a thermal sensor positioned so as to respond to motor temperature winding. Preferably, however, the sensing means comprises means for monitoring capacitor-run winding voltage and line voltage and determining the ratio of these two voltages.

The system of the invention includes means connected to the sensing means and switching element for, during each ON cycle, at least periodically sensing at least a representation of prevailing compressor motor loading and, in the event the prevailing loading exceeds a high load threshold loading, de-energizing the motor/compressor.

A self-calibrating control system further includes a means connected to the sensing means for determining a compressor motor reference loading, for example in the representative form of a ratio of capacitor-run winding voltage to line voltage, at a relatively early time during a compressor ON cycle by allowing a stabilization interval to elapse during which the refrigeration system stabilizes and the compressor motor is still lightly loaded, and then storing at least a representation of motor loading as the reference.

A calibrated control system includes a storage element for storing a permanent compressor motor reference loading established when the refrigeration system has a known correct refrigerant charge and the motor/compressor has a known load. Preferably, the permanent compressor motor reference loading is a particular ratio of capacitor-run winding voltage to line voltage.

The control system of the invention further includes means for re-energizing the motor/compressor after a cooling-off time interval has elapsed in the event the motor/compressor has been de-energized due to a recognized condition of excessive loading.

The system of the invention further includes a means for maintaining a count of the number of times the motor/compressor is de-energized due to a recognized condition of excessive loading, and terminating operation in the event the count exceeds a predetermined number.

Finally, the control system of the invention includes a means for measuring the time the motor/compressor is running and resetting the count when continuous run time exceeds a predetermined time duration indicating that the recognized condition of excessive loading was due to a cause other than insufficient condenser airflow. A representative time duration is in the order of eight minutes.

BRIEF DESCRIPTION OF THE DRAWINGS

While the novel features of the invention are set forth with particularlity in the appended claims, the invention, both as to organization and content, will be better understood and appreciated, along with other objects and features thereof, from the following detailed description taken in conjunction with the drawings in which:

FIG. 3, is a plot depicting compressor motor loading as a function of time under various conditions;

FIG. 6 comprises an exemplary program flowchart depicting the remaining portion of a first compressor-protection algorithm, and is to be read in conjunction with the flowcharts of FIGS. 4A, 4B, 5A and 5B; and FIG. 7 comprises an exemplary program flowchart depicting the remaining portion of a second compressor-protection algorithm, and is likewise to be read in conjunction with the flowcharts of FIGS. 4A, 4B, 5A and 5B.

DETAILED DESCRIPTION

Figure 1:
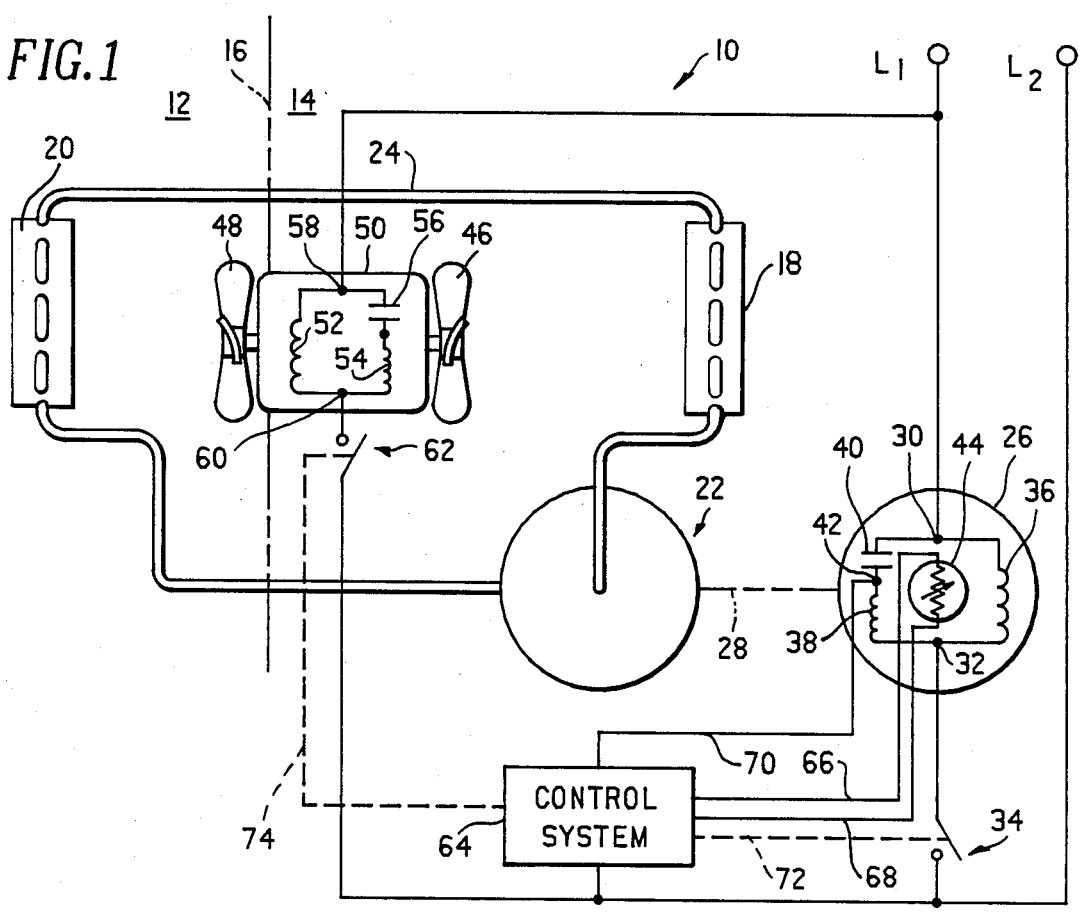
FIG. 1 is a diagrammatic view of a closed circuit refrigeration system typical of a room air conditioner.

With reference now to FIG. 1, shown in highly schematic form is a representative closed circuit refrigeration system 10, typical of a self-contained room air conditioner. The system is divided into an indoor side 12 and an outdoor side 14 by a partition 16. The refrigeration system 10 includes an outdoor condenser 18, an indoor evaporator 20, and a refrigerant compressor 22 for circulating refrigerant through the system. Although not illustrated, it will be appreciated that the refrigeration system 10 also requires a suitable flow restricting or expansion device somewhere in a line 24 between the condenser 18 and the evaporator 20, such as a capillary tube or an expansion valve.

The refrigerant compressor 22 is driven by a single-phase AC induction motor 26 via a shaft represented at 28. In nearly all cases, the compressor 22, the motor 26 and the shaft 28 are included within a hermetically sealed enclosure (not shown in FIG. 1). The compressor motor 26 has a pair of AC power input terminals 30 and 32 supplied from AC power lines $L_1$ and $L_2$, respectively, via a controlled switching element 34 connected between line $L_2$ and terminal 32. As schematically depicted, the motor 26 is of the type including a run winding 36 connected directly to the terminals 30 and 32, and a split phase capacitor-run winding 38 connected permanently in series with a capacitor 40 across the terminals 30 and 32.

While any suitable technique may be employed for sensing motor loading, the presently-preferred technique is to sense voltage across the capacitor-run winding 38 at a terminal 42, which is referenced to the terminal 32 when the controlled switching element 34 is closed.

As an alternative (or in addition for possible redundancy), a motor winding temperature sensor 44 may be employed, for example a thermistor as shown. It will be appreciated that conditions of excessive loading are manifested by an excessive increase in temperature, although temperature rise may lag the excessive loading. This is one of the reasons the preferred technique of sensing voltage across the capacitor-run winding 38 is superior.

Air circulation over the condenser 18 and evaporator 20 is provided by a pair of fan blades 46 and 48, respectively, driven by a common fan motor 50, which is also an AC induction motor of the type having a run winding 52 and a capacitor-run winding 54 in series with a capacitor 56. The motor 50 has terminals 58 and 60 to which AC power is supplied from $L_1$ and $L_2$ via controlled switching element 62 connected between line $L_2$ and the terminal 60.

During operation, high pressure refrigerant gas from the compressor 22 is directed into the condenser 18, and therein condensed by air circulated past the condenser 18 by the fan 46. Liquid refrigerant then flows from the condenser 18 to the evaporator 20 via the line 24, including the suitable flow-restricting expansion device (not shown). Within the evaporator 20, liquid refrigerant vaporizes to produce a cooling effect, and then returns to the compressor 22. Evaporator fan 48 circulates room air past the evaporator 20.

As noted above, a so-called "blocked-condenser" condition can occur whereby airflow past the condenser 18 can become insufficient, leading to excessive system temperatures and pressures, reflected as excessive loading on the compressor 22 and thus the motor 26. Typical condensers 18 have a tube-and-fin construction (not shown) in which closely-spaced plate-like fins (not shown) serve as heat exchange surfaces to aid in transferring heat between hot, high-pressure liquid refrigerant within the condenser 18 tubes and the circulating air. The spaces between the fins can become clogged by dirt, sand and other airborne matter, eventually causing insufficient airflow. There are, however, other potential causes of insufficient condenser 18 airflow, such as a failure of the fan 46 to rotate.

The present invention accordingly enables an insufficient condenser airflow condition to be recognized, and distinguished from a high operating load condition. When an insufficient condenser airflow condition is recognized, operation is terminated since the condition will normally not remedy itself.

The remaining element depicted in FIG. 1 is a control system 64 which serves a number of functions, including that of motor/compressor protection. In the event the protection provided is thermal overload protection, conductors 66 and 68 are included connecting the motor winding temperature sensor 44 to the control system 64.

Preferably, however, loading on the compressor 22 and thus the motor 26 is sensed by determining the ratio of capacitor-run winding 38 voltage to line ($L_1$, $L_2$) voltage. Accordingly, via line 70 the control system 64 senses the voltage across the capacitor-run winding 38 of the compressor motor 26.

For causing controlled actions to occur, it will be appreciated that the control system 64 activates the controlled switching elements 34 and 62 via respective control paths represented at 72 and 74 for energizing the motors 26 and 50.

In addition to the motor protection aspect to which the present invention is directed, it will be appreciated that the control system 64 also typically effects thermostatic control by cycling the motor 26 and thus the compressor 22 ON and OFF as required. For this purpose, it will further be appreciated that the control system 64 also includes at least one room temperature sensing element (not shown), and a means for user temperature set point adjustment, which together comprise a thermostat.

Figure 2:
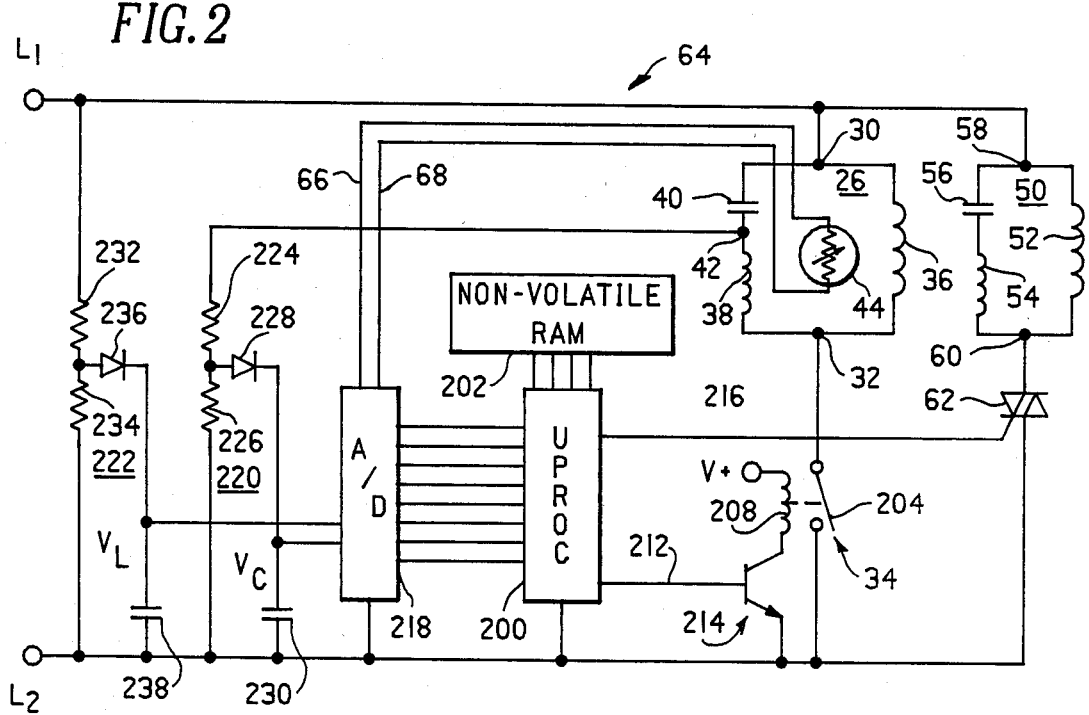
FIG. 2 is an electrical schematic circuit diagram depicting one form of control system applied to the room air conditioner of FIG. 1, FIG. 2 depicting, as alternatives, two different means for sensing compressor motor loading.

FIG. 2 depicts in greater detail a suitable control system, generally designated 64, applied to the refrigeration system of FIG. 1. The FIG. 2 control system is microprocessor-based, and thus includes a suitable microprocessor or microcontroller 200 operating under stored program control in a manner well known to those skilled in the art. While a variety of microprocessor systems may be employed, one which is suitable is a Motorola Semiconductor Type No. M6805 Single-Chip N-Channel Microcontroller which includes, within a single integrated circuit device, program ROM, RAM, a CPU and a variety of I/O line drivers.

To implement one of several alternative approaches described herein, which alternative is based on the system described in greater detail in the above-incorporated application Ser. No. 778,075, a non-volatile storage device 202, represented as non-volatile Random-Access Memory (RAM), is connected to the microprosessor 200. The storage device 202 must be capable of retaining digital data over an extended period of time, even without power, and of having data stored therein at least once. While a conventional RAM with battery back-up can be employed as the storage device 202, the requirements are perhaps better served by available memory devices known as Electrically-Programmable Read-Only Memories (EPROMs) and Electrically-Alterable Read-Only Memories (EAROMS). When employed, the non-volatile RAM 202 serves as a storage element for storing a permanent motor/compressor reference loading established when the refrigeration system has a known correct refrigerant charge and the motor/compressor has a known load.

For turning the compressor motor 26 ON and OFF the controlled switching element 34 of FIG. 1 in FIG. 2 more particularly may be seen to comprise a relay having contacts 204 and a coil 208 driven by an output line 212 from the microcontroller 200 via a switching transistor 214. Similarly, the FIG. 1 switching element 62 for the relatively lower-current fan motor 50 in FIG. 2 more particularly may be seen to comprise a triac 62 driven directly by another output line 216 of the microcontroller 200. Thus, the microcontroller 200 can selectively control the compressor and fan motors 26 and 50.

For input sensing, connected to the microcontroller 200 is an input-multiplexed analog-to-digital (A/D) converter 218. Any suitable A/D converter 218 can be employed. The resolution should be such that, over the range of voltages expected during operation, a change in voltage at least as small as 2% of the range will be recognized. For presenting analog inputs to the A/D converter 218, two conditioning circuits 220 and 222 are included, each comprising a voltage divider for scaling sensed voltage to a lower level, a rectifier, and a filter capacitor. More particularly, the conditioning circuit 220 comprises voltage divider resistors 224 and 226, diode 228 and capacitor 230; and the conditioning circuit 222 comprises voltage divider resistors 234, diode 236 and capacitor 238.

During operation, the conditioning circuits 220 and 222 serve to sample, with reference to $L_2$, voltage at the corresponding circuit node 42 or $L_1$, rectify the voltage, and store it as a respective representative voltage sample $V_C$ or $V_L$ across respective capacitor 230 or 238. The two voltage samples, $V_C$ and $V_L$ are respectively for the compressor motor 26 capacitor-run winding voltage 38 voltage and AC line voltage. The circuit time constants are such that the capacitors 230 and 238 hold the DC voltage samples for a time consistent with the sampling interval of the A/D converter 218 and microcontroller 200, which is typically 100 ms. A time constant in the order of 0.5 second is typical.

Although not presently preferred, motor winding temperature sensing may also be employed in the practice of the invention, in which case the thermistor 44 is connected to the microcomputer 200 via the conductors 66 and 68 and and the multiplexed A/D converter 218. In the event the temperature-sensing element is a simple ON/OFF thermostatic switch, it can be connected to a suitable digital input line of the microcontroller 200, bypassing the A/D converter 218 entirely.

It is believed that the principles of the invention will be better understood in view of a brief summary of certain characteristics of single-phase AC induction motors. The characteristics summarized next are described in greater detail in the above-incorporated applications Ser. Nos. 778,075 and 778,076.

Briefly, for a single-phase AC induction motor, $V_C/V_L$ (compressor capacitor-run winding voltage $V_C$ normalized with respect to line voltage $V_L$) is a function of motor RPM, and can be so plotted. For an exemplary two-pole single-phase AC induction motor having a synchronous speed of 3600 RPM, useful motor performance is in a relatively narrow band between approximately 3200 RPM (heavy load) and 3500 RPM (light load). If the loading on the motor is increased beyond a certain level, the motor "stalls", consistently at approximately 2900 RPM. This figure applies at both high and low line voltage.

Significantly, the normalized voltage ratio $V_C/V_L$ provides a reliable and sensitive measure of motor RPM and thus motor loading for any practical range of line voltages. Moreover, there is a close correlation between motor heating and RPM, and between the $V_C/V_L$ ratio and RPM.

The manner in which sensed loading on the compressor motor 26 is advantageously employed in the practice of the invention will now be considered with reference to FIG. 3. While any convenient technique for sensing compressor motor loading may be employed, a presently-preferred technique is to sense the ratio of capacitor-run winding voltage to line voltage as briefly summarized above. Thus, FIG. 3 plots the ratio $V_C/V_L$ as a function of time in minutes under various operating conditions. However, again it will be appreciated that other techniques for sensing compressor motor loading may be employed, two of which are directly sensing motor RPM, and sensing motor winding temperature.

The $V_C/V_L$ ratio has an inverse relationship to motor loading. Thus, the various curves of FIG. 3 generally indicate a decrease in the ratio $V_C/V_L$ as time proceeds, and this reflects an increase in compressor motor loading. A dash line 250 represents a threshold ratio of $V_C/V_L$ at or below which a condition of excessive loading is recognized, and the compressor motor is de-energized for at least a cooling-off interval. As discussed hereinabove, a condition of excessive loading can be caused either by a high operating load, not depicted in FIG. 3, or by a condition of insufficient condenser airflow, to which FIG. 3 is directed.

If the condenser 18 is only partially blocked, efficient operation is impaired, but the air conditioner may still continue to operate. Thus, in FIG. 3, lines 252 and 254 are plots of $V_C/V_L$ as a function of time for conditions of 70% condenser blockage and 85% condenser blockage respectively. Under such conditions, operation can nevertheless continue for an extended period of time, but will likely be terminated earlier than would otherwise be the case in the event there is also a high operating load or a marginally high operating load.

If the condenser is 100% blocked, then the plot line 256 is applicable. Thus, a fully blocked condenser produces short cycles, of in the order of four minutes ON time before the high load threshold is reached and the compressor is de-energized for a cooling-off interval. It may be noted that the plots 256 are stabilized cycles, such as result when the motor/compressor has been operating for a period of time, in contrast to having just been started from cold.

In accordance with the invention, high-load interrupt cycles are counted, and, after a predetermined number of such interrupted cycles, for example exceeding six, the unit is no longer allowed to restart, unless it is manually reset. Counting high-load interrupts in this manner, however, would produce eventual service interruption merely for a high operating load, unless provision is made to distinguish between interrupts caused by a high operating load and interrupts caused by a blocked condenser. Thus, in accordance with the invention the count is reset if the run time exceeds a predetermined time duration, for example, eight minutes.

A subsidiary aspect of the invention is the manner in which the high load threshold represented by the line 250 is established. Two different techniques are specifically disclosed herein, one of which is referred to as a self-calibrating technique, and is generally described in greater detail in the above-identified incorporated application Ser. No. 778,076. The other of which is herein termed a calibrated method, and is generally described in the above-incorporated application Ser. No. 778,075.

Considering first the calibrated approach, a refrigeration system characteristic exploited is that a heavy load on the compressor motor requires a substantial period of time to develop after initial startup, typically many minutes. The reason for this is that it takes several minutes to build up the high load pressures in the system across the capillary tube or expansion valve. The time is a direct result of the volume of the system and the restriction afforded by the capilary or expansion valve, as the case may be.

Typically, about thirty seconds after startup, the $V_C/V_L$ ratio gently peaks, representing an end of an initial stabilization interval after which startup transients, including liquid slugging effects and the like have dissipated, but the compressor is not yet significantly loaded by pressure build up. This peak in the $V_C/V_L$ ratio may be viewed as a condition of temporary stability where there is a relatively light load on the motor, while pressures in the system are slowly building up. From the point of view of compressor motor loading or motor speed, this condition of temporary stability allows a reference to to be established.

The self-calibrated approach to the invention also exploits the refrigeration system characteristic that the development of heavy loads on the compressor motor requires a substantial period of time to develop after initial startup, typically many minutes. This characteristic is used to establish a normalized capacitor-run winding reference when the system is first started.

Thus, at the factory, when the system has a known correct refrigerant charge and is operating under a known load, the reference is established, after approximately thirty seconds. At this time, the $V_C/V_L$ ratio represents a condition of temporary stability where there is a relatively light load on the motor, while pressures in the system are slowly building up. The thirty-second figure is exemplary only, and can be established non-critically within the range of five seconds to five minutes. The most important consideration is that the compressor motor has ceased to accelerate and is still lightly loaded, but is still loaded more than would be the case if refrigerant had escaped from the system such that there is virtually no load on the compressor. Another consideration is that start-up transients have dissipated.

Figure 4A:
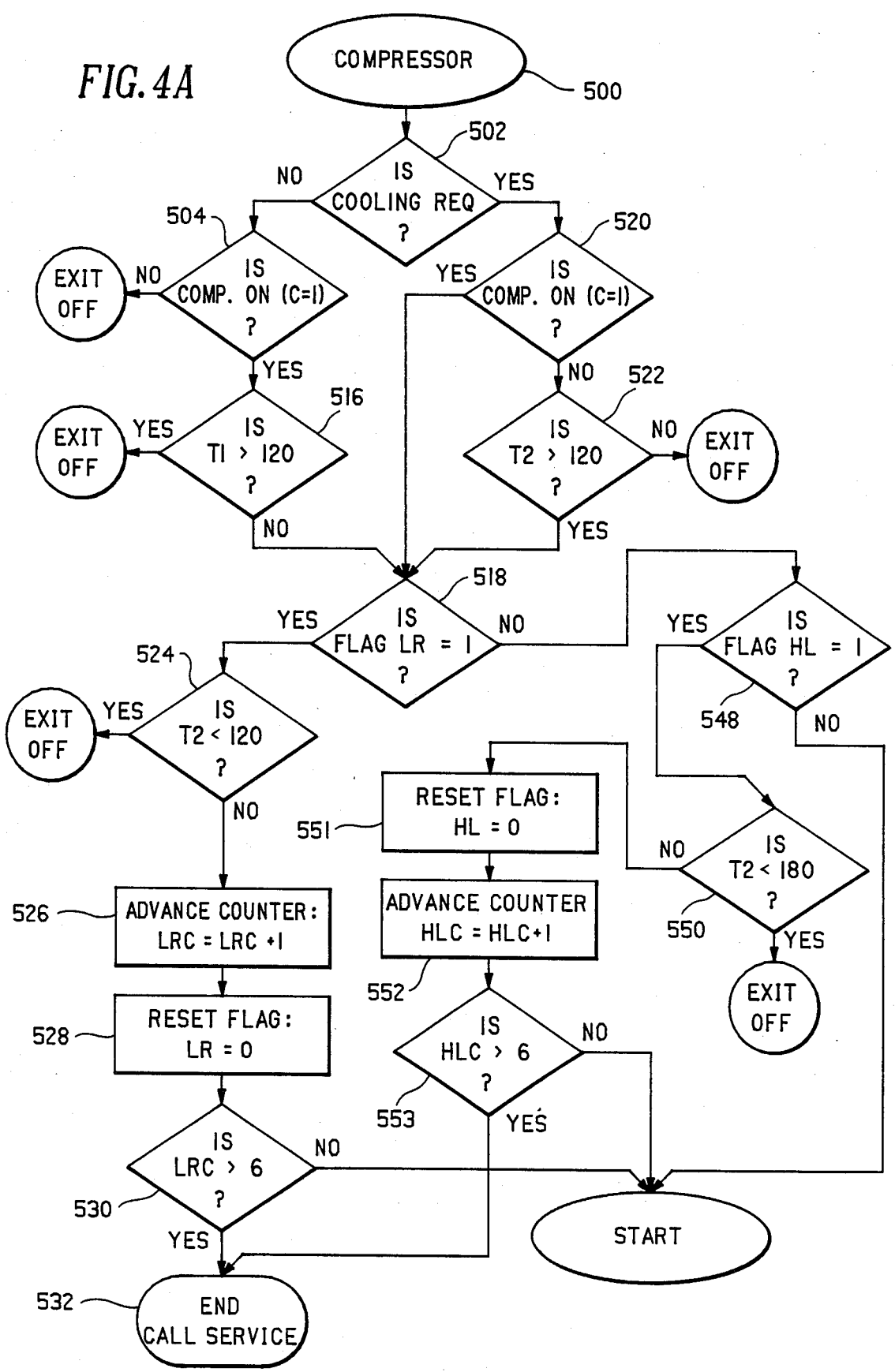
FIGS. 4A, 4B, 5A and 5B comprise portions of an exemplary program flowchart of suitable compressor-protection algorithms for the use in the practice of the invention.
Figure 4B:
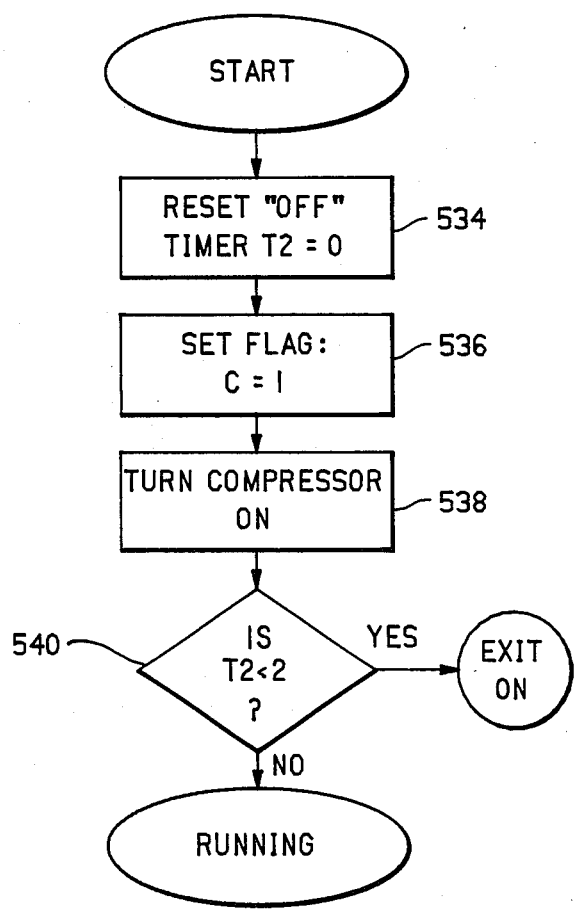
Figure 5A:
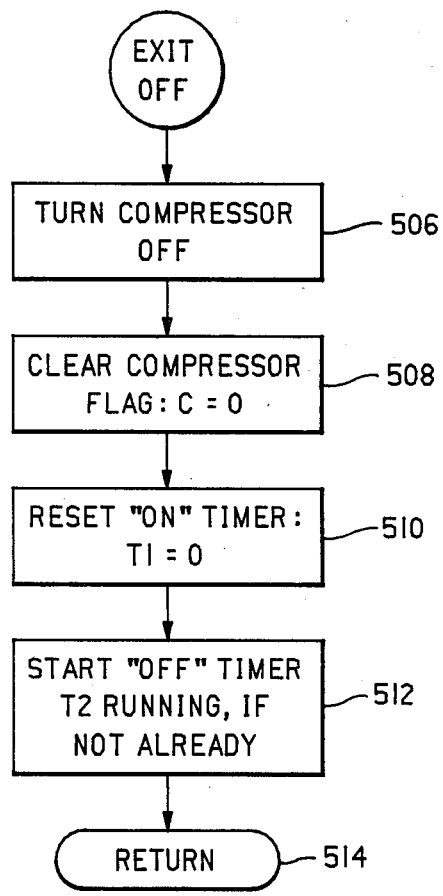
Figure 5B:
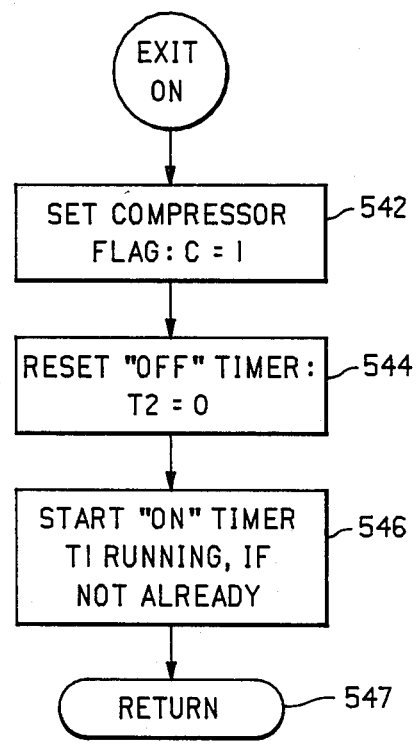

Referring now to FIGS. 4A, 4B, 5A 5B, 6 and 7, shown are typical program flowcharts implemented in the microcontroller 200 of FIG. 2. Two slightly different programs are depicted, one implementing the "self-calibrated" technique for establishing the high load threshold loading, and the other the "calibrated" technique. FIGS. 4A, 4B, 5A and 5B are common to both techniques. FIG. 6 is specific to the "self-calibrated" technique, while FIG. 7 is specific to the "calibrated" technique. FIGS. 4A, 4B 6, and 7 represent the main routines, while FIGS. 5A and 5B are subsidiary routines which are exited to from the flowcharts of FIGS. 4A, 4B, 6 and 7. For the purpose of these flowcharts, $V_L$ corresponds to A/C line voltage and $V_C$ corresponds to voltage across the capacitor-run winding 38 of the motor 26 driving the compressor 22.

While the subject invention is directed to the problem of protecting against excessive loading conditions, the control algorithm program flow chart of FIG. 6 ("self-calibrated") also provides for the detection of a locked rotor condition, and the flow chart of FIG. 7 ("calibrated") provides for the detection of both locked rotor and high speed conditions. The detection of these conditions, which is described only briefly herein, is described in greater detail in the above-incorporated applications, Ser. Nos. 778,076 and 778,075, respectively.

It may be noted that one of the operations called for by the flowcharts of FIGS. 6 and 7 is the sampling of the ratio $V_C/V_L$. It will be appreciated that this operation implies separately sampling, via the FIG. 2 A/D converter 218, both the capacitor-run winding voltage $V_C$ and the then-existing line voltage $V_L$, and performing the necessary division within the CPU of the microcontroller 200.

It will be appreciated that the routines of FIGS. 4A, 4B, 5A, 5B, 6 and 7 are merely one part of an overall control program which continuously cycles each of a number of subroutines, including those of FIGS. 4A-7, in order to perform all of the control operations required for the refrigeration system including those of thermostatic temperature control, with which the present invention not particularly concerned. The overall cycle may occur many times per second such that, in view of the relative slowness of the control events involved in a refrigeration system, from the point of view of each subroutine, each subroutine is essentially continuously executed from its entry point. Thus, while waiting for a particular time interval to elapse, for example, a particular routine is exited if the interval has not yet elapsed. However, the routine is re-entered perhaps only a fraction of a second later. The effect from the point of view that particular routine is equivalent to a wait loop involving that routine alone.

Before considering the steps of the flowchart in detail, several flags, a variable and timers are are defined in the following table.

| FLOWCHART FLAGS, VARIABLE AND TIMERS | |
|---|---|
| Flags | |
| C | Compressor. C=0 if OFF. C=1 if ON. |
| HL | High Load. HL=1 if high load condition has been detected; otherwise HL=0. |
| LR | Locked Rotor. LR=1 if locked rotor condition or high speed condition has been detected; otherwise LR=0. |
| Counter Variables | |
| HLC | High Load Counter. Used to count restart attempts following detection of excessive load conditions caused by either a high operating load or insufficient condenser airflow. |
| LRC | Locked Rotor Counter. Used to count restart attempts following detection of locked rotor conditions, as well as high speed conditions (FIG. 7 only). |
| Timers | |
| T1 | Accumulated compressor ON time in seconds since last reset of T1. Timer maintained by either software or hardware. |
| T2 | Accumulated compressor OFF time in seconds since last reset of T2. Timer maintained by either software or hardware. |

The response to the detection of either a locked rotor condition or a high speed condition is similar to that for the detection of an excessive load condition; namely a timed fault interruption followed by restart. After a limited number of restarts, operation is terminated pending a service call. In the illustrative embodiment separate counters, namely a Locked Rotor Counter (LRC) and High Load Counter (HLC), are provided to reduce the likelihood of a premature service call being required. It will be appreciated, however, that a single counter could be similarly employed, since the same control action is taken in either case, namely, a timed fault interruption followed by a restart, with a limited number of restarts before operation is entirely terminated for a service call.

Referring now to FIG. 4A in detail, a "COMPRESSOR" routine begins at 500 which is entered over and over on a continuous basis whenever the system is operating in a cooling mode.

At decision Box 502, thermostat circuitry (not shown) is queried to determine whether cooling is required. If the answer in box 502 is "no", then decision box 504 is entered, which checks the compressor flag "C" to determine whether the compressor is ON. If the answer in box 504 is "no", i.e. if C=0, then the FIG. 5A EXIT OFF routine is entered.

Referring briefly to the FIG. 5A "EXIT OFF" routine, in box 506, the compressor is turned OFF, if it is not already. Then, in Box 508, the compressor flag "C" is cleared to 0 in the event it is not already 0. Next, in box 510, the compressor "ON" timer T1 is resent to 0, if it is not 0 already. In box 512, the "OFF" timer T2 is started running if it is not already running. Finally, at box 514, the "compressor" routine is exited entirely so another part of the control program (not shown) can be executed, before execution returns to the FIG. 4A "COMPRESSOR" routine.

Returning to FIG. 4A, if the answer in decision box 504 is "yes", then decision box 516 is entered, the purpose of which to avoid short-cycling of the compressor by forcing a two-minute minimum ON time (in the absence of a fault condition). Thus, in box 516, if the compressor "ON" timer T1 is greater than 120 seconds, the answer is "yes" and the routine is exited through "EXIT OFF". The minimum time has been satisfied.

If the answer in box 516 is "no", then the two-minute minimum on time has not been satisfied, and the compressor remains running. Execution then proceeds to decision box 518, described hereinbelow.

Returning to decision box 502, if the answer is "yes" indicating that cooling is required, then execution proceeds to decision box 520 which checks flag "C" to determine whether the compressor is already running. If the answer in box 520 is "yes" then execution proceeds directly to decision box 518.

If the answer in decision box 520 is "no", then decision box 522 is entered which forces a two-minute OFF time also to avoid short cycling, as a complement to decision box 516 which forces a two-minute minimum ON time. More particularly, in box 522, the compressor "OFF" timer T2 is checked to ensure the compressor has been off for at least two minutes before the rest of the routine of FIGS. 4A and 4B is allowed to execute, which will have the effect of eventually turning the compressor ON. Thus, if the answer in box 522 is "no", control passes to the "EXIT OFF" routine. A loop is thus effectively established, whereby execution continuously returns to box 522 until such time as two minutes of accumulated OFF time have elapsed, and the answer in box 522 becomes "yes". If (or when) the answer in box 522 is "yes", execution proceeds to decision box 518.

In box 518, flag "LR" is checked, which will be set if a locked rotor has previously been detected. In the case of the "calibrated" approach of the invention, the specific flowchart for which is shown in FIG. 7, the flag "LR" serves an additional purpose and accordingly will also be set if a high speed condition has previously been detected.

If the answer in box 518 is "yes", then box 524 is entered which establishes a two-minute cool down interval using the compressor "OFF" timer T2. If the accummulated "OFF" time is less than two minutes, then the answer in box 524 is "yes", and execution passes to "EXIT OFF". A loop is thus established, whereby execution continuously returns to box 524 until such time as two minutes have elapsed, and the answer in box 524 is accordingly "no".

At this point, the counter LRC is advanced by one in box 526 and the flag LR is reset to 0 in box 528.

In order to terminate operation completely in the event that a locked rotor (or possibly a high speed) condition has been detected more than six times and has not been cleared, in decision box 530 the counter LRC is compared to the predetermined number six. If LRC is greater than six, then the answer in box 530 is "yes", and control passes to box 532 which terminates operation entirely until the system is serviced by a technician who, among other things, will reset the systems.

If the answer in box 530 is "no" then the compressor can be restarted, and program execution proceeds to a "START" routine depicted in FIG. 4B.

Considering the FIG. 4B "START" routine, in box 534 the "OFF" timer T2 is reset to 0, in box 536 the compressor flag C is set to 1, and in box 538, the compressor is turned ON. Decision box 540 then delays any further tests for two-second interval during which a compressor is given time to come up to an initial equilibrium speed. Thus, a loop is effectively established through decision box 540 and the FIG. 5B "EXIT ON" routine until two seconds have elapsed, and the answer in decision box 540 is "no".

Briefly considering the FIG. 5B "EXIT ON" routine, in box 542, the compressor flag "C" is set to 1 if it is not already, and the compressor "OFF" timer T2 is reset to 0 in box 544 if it is not already. Then, in box 546, the "ON" timer T1 is started running if it is not already. Finally, in box 547, a return is made to the remainder of the overall control program (not shown). At the conclusion of the FIG. 4B "START" routine, execution proceeds to a "RUNNING" routine, one version of which is depicted in FIG. 6 and another version of which is shown in FIG. 7.

Returning to the FIG. 4A decision box 518, if the flag "LR" is not set, then the answer is "no", and execution proceeds to decision box 548 where the flag "HL" is checked to determine whether a high load condition has previously been detected. In accordance with the invention, the flag "HL" is thus set if a condition of excessive loading has previously been detected, whether due to a "high operating load" or due to an "insufficient condenser airflow" condition. If the answer in box 548 is "no", then execution passes to the FIG. 4B "START" routine, leading to the compressor being turned ON as described above.

If, in decision box 548, it is determined that "yes", the flag "HL" is set, then decision box 550 is entered which establishes a three-minute cool down interval before the compressor is allowed to restart, subject to a test of the counter "HLC" as described next below. In a manner similar to that of the two-minute cool down interval of box 524 described above, a loop is effectively established through decision box 550 and the FIG. 5A "EXIT OFF" routine until such time as three minutes of compressor OFF time have elapsed and the answer in box 550 is "no".

At this point, when three minutes of compressor OFF time have elapsed to provide a cooling-off interval, box 551 is entered which resets the flag "HL". The counter variable HLC is employed in the practice of the invention to count the number of times the compressor is de-energized due to a recognized condition of excessive loading. Execution proceeds from box 551 to the box 552 where the counter HLC is advanced by one as described above, and subsequently tested against the representative predetermined number six in decision box 553. From decision box 553, either a service condition is indicated, or the FIG. 4B "START" routine is entered.

The "RUNNING" routine of FIG. 6, specific to the "self-calibrated" approach which is one of the alternatives of the invention, will now be considered. Other aspects of "self-calibrated" refrigeration control systems and methods are disclosed in the above-incorporated application Ser. No. 778,076.

The FIG. 6 "RUNNING" routine is entered from the FIG. 4B "START" routine, if at least two seconds have elapsed since the compressor was started. To begin, box 656 is entered where the prevailing ratio of $V_C/V_L$ is sampled.

In order to ensure that the compressor motor has in fact started, the $V_C/V_L$ ratio is tested in decision box 658 against a locked rotor ratio established, for example, as 0.5. As discussed in greater detail in the above-incorporated application Ser. No. 778,076, the locked rotor ratio of 0.5 is somewhat arbitrary inasmuch as effective protection would be provided over a relatively large range, for example a locked rotor ratio range of 0.2 to 0.7.

If a locked-rotor condition exists, then the decision in box 658 is "yes", and program flow branches to box 660 where the flag "LR" is set to one, and execution proceeds to the FIG. 5A "EXIT OFF" routine. As already described above, with reference to FIG. 4A, the flag "LR" is utilized by decision boxes 518, 524 and 530 to establish a two-minute cool down interval, and a limited restart count.

If the motor/compressor has reached a speed such that it can be concluded that the rotor is not locked, then the answer in box 658 is "no", and decision box 662 is entered the purpose of which is to allow an exemplary thirty-second stabilization interval to elapse before establishing a compressor motor reference ratio. If the stabilization interval has not yet elapsed, then the answer in decision box 662 is "yes", and the $V_C/V_L$ ratio which was sampled in box 556 is stored merely temporarily as a reference variable "REF". During each pass through the routine during the thirty-second stabilization interval, the ratio $V_C/V_L$ is sampled in box 656, and the reference variable "REF" is updated in box 664. The final update occurs at T=30 and the value of $V_C/V_L$ at T≧30 becomes the final value for the reference "REF" and is used thereafter.

Upon subsequent passes through the FIG. 6 routine, the answer in decision box 662 is "no", because the thirty-second stabilization interval is over.

Decision box 665 is then entered which checks for an exemplary three minutes of continuous run time. If the continuous run time exceeds three minutes, signifying succeessful start-up, i.e. no locked rotor condition, then box 666 is entered to reset the counter LRC.

Decision box 667 is then entered, which tests for a high load on the compressor by determining whether the ratio $V_C/V_L$ is less than 0.8 times the stored reference ratio. Thus, the quantity 0.8 times REF is in effect the high load threshold ratio, discussed hereinabove with reference to FIG. 3.

If the answer in the high load test box 667 is "yes", then in box 668 the flag "HL" is set to 1, and the compressor is de-energized through the FIG. 5A "EXIT OFF" routine.

As described above with reference to FIG. 4A, the flag "HL" is used in decision boxes 548 and 550 to establish a three-minute cool-down interval, and then a compressor restart, subject, in accordance with the invention, to the count maintained by the counter variable HLC.

Advancing the counter HLC in box 552 (FIG. 4A) in response to high load conditions will produce a service interruption, even for a high operating load condition, after the predetermined number of counts (six in FIG. 4A box 553), unless provision is made to distinguish between a "high operating load" and a condition of "insufficient compressor airflow". This desired result of so distinguishing is achieved by the test of decision box 667 (FIG. 6) in combination with decision box 670, which checks for an exemplary eight minutes of continuous run time. If continuous run time exceeds eight minutes, then box 672 is entered to reset the counter HLC.

The alternative "RUNNING" routine of FIG. 7, which implements the "calibrated" aspect of the invention will now be considered. General principles of "calibrated" techniques are described in greater detail in the above-incorporated application Ser. No. 778,075.

The FIG. 7 "RUNNING" routine is entered if at least two seconds have elapsed since the compressor was started. First, box 756 is entered where the prevailing ratio $V_C/V_L$ is sampled, for comparison against the reference voltage, stored for example in the FIG. 2 non-volatile RAM 202. It will be appreciated that the reference voltage is established as part of the factory calibration procedure for the particular unit, as described hereinabove.

In decision box 758 a locked-rotor test is done by determining whether the ratio $V_C/V_L$ is less than 0.5 times $V_{REF}$. If the answer is "yes" then in box 760 the flag "LR" is set to 1, and execution proceeds to "EXIT OFF". As described above, the flag "LR" is utilized to establish a two-minute cool down interval, and a limited restart count.

If the motor/compressor has reached a speed such that it can be concluded that the rotor is not locked, then the answer in box 758 is "no", and decision box 762 is entered, the purpose of which is to bypass the high speed test of box 764 until the compressor has been running for at least thirty seconds such that there is at least a normal light load on the compressor, assuming there is a normal amount of refrigerant in the system.

Decision box 764 thus performs a high speed test by determining whether the ratio $V_C/V_L$ is greater than 1.1 times the reference voltage $V_{REF}$. If the answer in box 764 is "yes", indicative of an excessively light load on the compressor as would result from a loss of refrigerant or possibly blocked evaporator airflow, then box 760 is entered to set flag "LR" to 1 and to turn OFF the compressor through the "EXIT OFF" routine.

If the answer in box 764 is "no", then decision box 766 is entered which tests for a high load on the compressor by determining whether the ratio $V_C/V_L$ is less than or equal to 0.8 times $V_{REF}$. If the answer is "yes", then flag "HL" is set to 1 in box 768, and the compressor is de-energized through the "EXIT OFF" routine.

As described above with reference to FIG. 4A, the flag "HL" is used in decision boxes 548 and 550 to establish a three-minute cool down interval, and then a compressor restart subject, in accordance with the invention, to the count maintained by the counter variable HLC. Thus, FIG. 7 decision box 765 corresponds to FIG. 6 decision box 667.

Accordingly, if the answer in the high load test box 765 is "yes", then in box 768 the flag "HL" is set to 1, and the compressor is de-energized through the FIG. 5A "EXIT OFF" routine. If the answer to the high load test of box 765 is "no", decision box 766 is entered which checks for an exemplary three minutes of continuous run time. If the continuous run time exceeds three minutes, signifying the absence of a locked rotor condition, box 767 is entered to reset the LRC counter. In any event, the program then proceeds to decision box 770.

As noted above, advancing the counter HLC in box 552 (FIG. 4A) in response to high load conditions will produce a service interruption, even for a high operating load condition, after the predetermined number of counts (six in FIG. 4A box 553), unless provision is made to distinguish between a "high operating load" and a condition of "insufficient compressor airflow". In FIG. 7, this desired result of so distinguishing is achieved by the test of decision box 765 in combination with decision box 770, which checks for an exemplary eight minutes of continuous run time. If continuous run time exceeds eight minutes, then box 772 is entered to reset the counter HLC.

While specific embodiments of the invention have been illustrated and described herein, it is realized that numerous modifications and changes will occur to those skilled in the art. It is therefore to be understood that the appended claims are intended to cover all such modifications and changes which fall within the true spirit and scope of the invention.

What is claimed is:

1. A self-calibrating method used in protecting a refrigerant compressor in a closed-circuit refrigeration system against excessive loading caused by either a high operating load or insufficient condenser airflow, independent of compressor and system size, the compressor being driven by a single-phase induction motor supplied from an AC power line and of the type including a capacitor-run winding, the refrigeration system having a condenser and an evaporator connected in series with the compressor, and the refrigeration system being cycled ON and OFF during operation, said method comprising:

determining, as an indicator of motor loading, a compressor motor reference ratio at a relatively early time during a compressor ON cycle by allowing a stabilization interval to elapse during which the refrigeration system stabilizes and the compressor motor is still lightly loaded, then sensing the ratio of capacitor-run winding voltage to line voltage, and storing at least a representation of the sensed ratio as the compressor motor reference ratio; and thereafter, during each ON cycle, at least periodically sensing the prevailing ratio of capacitor-run winding voltage to line voltage, comparing the prevailing ratio to the compressor motor reference ratio, and in the event the prevailing ratio is below a high-load threshold ratio established as a predetermined fraction of the reference ratio, recognizing a condition of excessive loading and de-energizing the motor/compressor;

in the event the motor/compressor has been de-energized due to a recognized condition of excessive loading, allowing a cooling-off time interval to elapse and then re-starting the motor/compressor;

maintaining a count of the number of times the motor/compressor is de-energized due to a recognized condition of excessive loading and terminating operation in the event the count exceeds a predetermined number; and measuring the the time the motor/compressor is running and resetting the count when continuous run time exceeds a predetermined time duration indicating that the recognized condition of excessive loading was due to a cause other than insufficient condenser airflow.

2. A calibrated method used in protecting a refrigerant compressor in a closed-circuit refrigeration system against excessive loading caused by either a high operating load or insufficient condenser airflow, independent of compressor and system size, the compressor being driven by a single-phase induction motor supplied from an AC power line and the type including a capacitor-run winding, the refrigeration system having a condenser and an evaporator connected in series with the compressor, and the refrigeration system being cycled ON and OFF during operation, said method comprising:

establishing a permanent compressor motor reference ratio when the refrigeration system has a known correct refrigerant charge and the motor/compressor has a known load by sensing the ratio of capacitor-run winding voltage to line voltage, and storing at least a representation of the sensed ratio as the permanent compressor motor reference ratio; and thereafter, during each ON cycle, at least periodically sensing the prevailing ratio of capacitor-run winding voltage to line voltage and, in the event the prevailing ratio is less than a high load threshold ratio established as a predetermined function of the permanent reference ratio, recognizing a condition of excessive loading and de-energizing the motor/compressor;

in the event the motor/compressor has been de-energized due to a recognized condition of excessive loading, allowing a cooling-off time interval to elapse and then re-starting the motor/compressor;

maintaining a count of the number of times the motor/compressor is de-energized due to a recognized condition of excessive loading and terminating operation in the event the count exceeds a predetermined number; and measuring the time the motor/compressor is running and resetting the count when continuous run time exceeds a predetermined time duration indicating that the recognized condition of excessive loading was due to a cause other than insufficient condenser airflow.

3. A self-calibrating control system used in protecting a refrigerant compressor in a closed-circuit refrigeration system against excessive loading caused by either a high operating load or insufficient condenser airflow, independent of compressor and system size, the compressor being driven by a single-phase induction motor supplied from an AC power line and of the type including a capacitor-run winding, the refrigeration system having a condenser and an evaporator connected in series with the compressor, and the refrigeration system being cycled ON and OFF during operation, and control system comprising:

a switching element for cycling the refrigeration system ON and OFF by energizing and de-energizing the compressor motor;

sensing means for sensing the ratio of capacitor-run winding voltage of AC line voltage;

means connected to said sensing means for determining, as an indicator of motor loading, a compressor motor reference ratio at a relatively early time during a compressor ON cycle by allowing a stabilization interval to elapse during which the refrigeration system stabilizes and the compressor motor is still lightly loaded, and then storing at least a representation of the ratio of capacitor-run winding voltage to line voltage as the compressor motor reference ratio;

means connected to said sensing means and said switching element for thereafter, during each ON cycle, at least periodically comparing the prevailing ratio of capacitor-run winding voltage to line voltage to the reference ratio and, in the event the prevailing ratio is below a high load threshold ratio established as a predetermined fraction of the reference ratio recognizing a condition of excessive loading and de-energizing the motor/compressor;

means for re-energizing the motor/compressor after a cooling-off time interval has elapsed in the event the motor/compressor has been de-energized due to a recognized condition of excessive loading;

means for maintaining a count of the number of times the motor/compressor is de-energized due to a recognized condition of excessive loading and terminating operation in the event the count exceeds a predetermined number; and means for measuring the time the motor/compressor is running and resetting the count when continuous run time exceeds a predetermined time duration indicating that the recognized condition of excessive loading was due to a cause other than insufficient condenser airflow.

4. A calibrated control system used in protecting a refrigerant compressor in a closed-circuit refrigeration system against excessive loading caused by either a high operating load or insufficient condenser airflow, independent of compressor and system size, the compressor being driven by a single-phase induction motor supplied from an AC power line and the type including a capacitor-run winding, the refrigeration system having a condenser and an evaporator connected in series with the compressor, and the refrigeration system being cycle ON and OFF during operation, said control system comprising:

a switching element for cycling the refrigeration system ON and OFF by energizing and de-energizing the compressor motor;

sensing means for sensing the ratio of capacitor-run winding voltage to AC line voltage;

a storage element for storing a permanent compressor motor reference ratio established as the ratio of capacitor-run winding voltage to line voltage when the refrigeration system has a known correct refrigerant charge and the motor/compressor has a known load;

means connected to said sensing means and said switching element for, during each ON cycle, at least periodically sensing the prevailing ratio of capacitor-run winding voltage to line voltage and, in the event the prevailing ratio is less than a high load threshold ratio established as a predetermined function of the permanent reference ratio, recognizing a condition of excessive loading and de-energizing the motor/compressor;

means for re-energizing the motor/compressor after a cooling-off time interval has elapsed in the event the motor/compressor has been de-energized due to a recognized condition of excessive loading;

means for maintaining a count of the number of times the motor/compressor is de-energized due to a recognized condition of excessive loading and terminating operation in the event the count exceeds a predetermined number; and means for measuring the time the motor/compressor is running and resetting the count when continuous run time exceeds a predetermined time duration indicating that the recognized condition of excessive loading was due to a cause other than insufficient condenser airflow.

* * * * *